(12) United States Patent
Robin et al.

(10) Patent No.: US 12,092,234 B2
(45) Date of Patent: Sep. 17, 2024

(54) DEVICE FOR A VALVE SYSTEM AND USE THEREOF

(71) Applicant: VERNET, Ollainville (FR)

(72) Inventors: Guillaume Robin, Montgeron (FR); Samuel Marquier, Evry (FR)

(73) Assignee: VERNET, Ollainville (FR)

( * ) Notice: Subject to any disclaimer, the term of this patent is extended or adjusted under 35 U.S.C. 154(b) by 108 days.

(21) Appl. No.: 18/001,410

(22) PCT Filed: Jun. 11, 2021

(86) PCT No.: PCT/EP2021/065837
§ 371 (c)(1),
(2) Date: Dec. 9, 2022

(87) PCT Pub. No.: WO2021/250257
PCT Pub. Date: Dec. 16, 2021

(65) Prior Publication Data
US 2023/0129850 A1    Apr. 27, 2023

(30) Foreign Application Priority Data

Jun. 12, 2020 (FR) .................................... 2006150

(51) Int. Cl.
*F16K 11/00* (2006.01)
*E03C 1/04* (2006.01)
(Continued)

(52) U.S. Cl.
CPC .......... *F16K 19/006* (2013.01); *E03C 1/0403* (2013.01); *F16K 27/0263* (2013.01);
(Continued)

(58) Field of Classification Search
CPC .. F16K 19/006; F16K 27/0263; F16K 27/041; F16K 11/07; F16K 11/044;
(Continued)

(56) References Cited

U.S. PATENT DOCUMENTS

| 5,433,378 A | * | 7/1995 | Orlandi | F16K 11/18 |
| | | | | 236/12.22 |
| 5,931,374 A | * | 8/1999 | Knapp | F16K 11/0743 |
| | | | | 236/12.2 |

(Continued)

FOREIGN PATENT DOCUMENTS

| FR | 2821411 A1 | 8/2002 |
| WO | 9530939 A1 | 11/1995 |
| WO | 0052545 A1 | 9/2000 |

OTHER PUBLICATIONS

Search Report for International Application No. PCT/EP2021/065837 dated Sep. 15, 2021.
(Continued)

*Primary Examiner* — Minh Q Le
(74) *Attorney, Agent, or Firm* — Pearne & Gordon LLP

(57) ABSTRACT

Device for a valve system, comprising: a housing with a seat for being coupled to a base and exchanging water streams when the housing is in a first coupling position, the seat comprising a first seat opening fluidly connecting to a first base opening when the housing is in the first coupling position; an adjuster which is contained inside the housing for adjusting the flow rate of one of the water streams; and a controller for controlling the adjuster. To avoid any complications in the event of an error while making the system more versatile, the seat comprises a breakable portion which can be broken off from the seat to enable it to be coupled in a second coupling position, the first seat opening subsequently fluidly connecting to a second base opening.

11 Claims, 5 Drawing Sheets

(51) Int. Cl.
*F16K 27/02* (2006.01)
*F16K 11/044* (2006.01)
*F16K 11/07* (2006.01)
*F16K 27/04* (2006.01)
*F16K 31/00* (2006.01)
*G05D 23/13* (2006.01)

(52) U.S. Cl.
CPC ............ *F16K 11/044* (2013.01); *F16K 11/07* (2013.01); *F16K 27/041* (2013.01); *F16K 31/002* (2013.01); *G05D 23/1346* (2013.01); *G05D 23/1353* (2013.01)

(58) Field of Classification Search
CPC . F16K 31/002; E03C 1/0403; G05D 23/1353; G05D 23/1346
USPC ....... 137/15.21, 15.08, 15.09, 315.27, 625.4, 137/603, 896, 898; 4/677; 251/321
See application file for complete search history.

(56) References Cited

U.S. PATENT DOCUMENTS

| | | | | |
|---|---|---|---|---|
| 6,089,462 | A * | 7/2000 | Osvaldo | G05D 23/1346 236/12.2 |
| 6,517,006 | B1 * | 2/2003 | Knapp | F16K 3/34 236/12.2 |
| 7,770,808 | B2 * | 8/2010 | Ruga | G05D 23/1353 236/100 |
| 7,806,134 | B1 * | 10/2010 | Chang | G05D 23/1313 137/98 |
| 7,850,088 | B2 * | 12/2010 | Wei | G05D 23/136 236/12.1 |
| 8,056,823 | B2 * | 11/2011 | Xie | G05D 23/1353 236/12.17 |
| 8,740,097 | B2 * | 6/2014 | Platet | G05D 23/1353 236/12.11 |
| 8,899,491 | B2 * | 12/2014 | Knapp | G05D 23/1353 236/100 |
| 10,025,326 | B2 * | 7/2018 | Ottelli | G05D 23/1346 |
| 10,167,963 | B1 * | 1/2019 | Chang | F16K 11/072 |
| 10,570,591 | B2 * | 2/2020 | Chang | F16K 17/38 |
| 2004/0016815 | A1 | 1/2004 | Bergmann et al. | |
| 2018/0059693 | A1 | 3/2018 | Rodriguez | |
| 2019/0227583 | A1 * | 7/2019 | Jager | G05D 23/1346 |
| 2020/0132200 | A1 * | 4/2020 | Chang | F16K 39/045 |
| 2021/0325918 | A1 * | 10/2021 | Ottelli | E03C 1/0412 |
| 2021/0364098 | A1 * | 11/2021 | Tzeng | F16K 27/044 |
| 2022/0196165 | A1 * | 6/2022 | Tueshaus | F16K 47/04 |
| 2023/0052109 | A1 * | 2/2023 | Wang | F16K 11/074 |

OTHER PUBLICATIONS

Search Report for French Application No. FR 2006150 dated Feb. 12, 2021.

* cited by examiner

DEVICE FOR A VALVE SYSTEM AND USE THEREOF

CROSS-REFERENCE TO RELATED APPLICATIONS

This is a National Stage application of PCT international application PCT/EP2021/065837, filed on Jun. 11, 2021, which claims priority from French Patent Application No. 20 06150, filed on Jun. 12, 2020, both which are incorporated herein by reference in their entirety.

The invention relates to a device for a valve system, the valve system comprising such a device, and a use of the device and of the valve system.

The present invention relates to the technical field of valves, in particular for plumbing purposes.

A wall-mounted valve system with a built-in base is known, e.g. for equipping a shower and for feeding a shower head. Such system comprises a water temperature control knob, which protrudes directly from the wall. Such knob controls a mixer cartridge, which is mounted on the knob base so as to be connected to a hot water inlet and to a cold water inlet arranged inside the wall. The mixer cartridge mixes hot and cold water with a thermostatic control, depending on the position of the temperature control knob, so as to form a mixed water stream at the desired temperature, which then exits through the shower head. When installing the system, the fitter connects the base with the water inlets and embeds it in the base into the wall. Once the base is built-in, the fitter couples the mixer cartridge to the base, which connects the water inlets to the mixer cartridge in one go.

It should be considered that most thermostatic, and even non-thermostatic cartridges work properly only if the hot water inlet is connected to the hot water inlet of the cartridge while the cold water inlet is connected to the cold water inlet of the cartridge, and not vice versa.

However, due to an error made by the fitter, it can happen that the hot water inlet and the cold water inlet were connected to the base in an inverted manner. Generally, the fitter realizes such error when the installation is refilled, once the base is already built-in and the cartridge is already mounted onto the base. To remedy such problem, the only solution is, when possible, to extract the base which was built-in so as to reverse the connections. Such heavy operation, even when possible, leads to a delay and to a significant additional cost for the work to be done.

In other cases, the configuration of the premises prevents mounting the base by connecting the water inlets correctly, due to lack of space. This is the case e.g. when two valve systems have to be built-in back-to-back into the same wall. In such a case, for the first valve system, it is possible that the cold water inlet is on the left and the hot water inlet is on the right, when looking at the valve system from the front, whereas, for the second valve system, the cold water inlet is on the right and the hot water inlet is on the left when looking at the second valve system from the front. Henceforth, it is necessary to consider a solution other than built-in valves, which is not suitable for the case where the hot and cold water inlets are reversed.

The invention aims in particular to overcome the drawbacks of the aforementioned prior art by proposing a novel device for a valve system, which avoids any complication in the event of an installation error while making the valve system more versatile.

The subject matter of the invention is a device for a valve system, comprising a housing, which comprises a seat, by means of which the housing is designed for being coupled to a base, for exchanging a water stream between the base and the housing through the seat, the seat matching the base so as to impose that the coupling of the housing with the base takes place only when the housing is in a first coupling position with respect to the base. The seat includes a first seat opening configured for leading a first water stream amongst the water streams and for fluidically connecting to a first base opening of the base when the housing is coupled with the base in the first coupling position, so that the first water stream is led through the first base opening. The device further comprises an adjuster, which is contained within the housing for adjusting the flow-rate of at least one of said water streams, and a controller, which protrudes from the housing and controls the adjuster.

According to the invention, the seat comprises a breakaway part, which is configured for being broken from the seat so that the coupling of the housing with the base takes place when the housing is in a second coupling position with respect to the base; and the first seat opening is configured for fluidically connecting to a second base opening belonging to the base, when the housing is coupled with the base in the second coupling position, so that the first water stream is led through the second base opening.

One idea underlying the invention is that, when the breakaway part of the seat is broken, the seat is configured so that the coupling of the housing with the base takes place when the housing is in the first coupling position with respect to the base and when the housing is in the second coupling position with respect to the base. When not broken from the seat, the breakaway part is configured for preventing the coupling of the housing with the base from taking place when the housing is in the second coupling position with respect to the base and so that the coupling of the housing with the base takes place when the housing is in the first coupling position with respect to the base.

An idea underlying the invention is to provide that, without specific action by the fitter, the seat requires that the housing be coupled in the first coupling position, so as to ensure that the fluidic connections between the housing and the base are correct when the base has been correctly connected to the water network. However, where the fitter knows that the base has been connected to the water network incorrectly, knowingly or by error, e.g. by reversing a hot water inlet and a cold water inlet, the fitter can intentionally break the breakaway part of the base so as to couple the housing in the second coupling position, thereby modifying the fluidic connection of the first seat opening with the base. The correct operation of the device is thus ensured without modifying the connection of the base to the water network. The presence of the breakaway part can further be useful during manufacture because the breakaway part can allow a human operator or a machine to easily identify which is the orientation of the seat. In particular, if a plurality of seat openings are provided, it is easy to identify which is the first seat opening, knowing the position thereof with respect to the breakaway part.

Preferentially, the seat comprises a second seat opening, which is configured for: leading a second water stream, amongst said water streams, and fluidically connecting to the second base opening when the housing is coupled to the base in the first coupling position, so that the second water stream is led through the second base opening. Preferentially, the second base opening is configured for fluidically connecting to the first base opening when the housing is coupled with the base in the second coupling position, so that the second water stream is led through the first base opening.

Preferentially, the first seat opening and the second seat opening are mutually symmetrical about a primary axis crossing through the seat.

Preferentially, the breakaway part comprises a breakaway pin provided with an incipient breaking so same can be broken, the breakaway pin being arranged off-centered with respect to the primary axis.

Preferentially, the device comprises a mixer, which is formed by the adjuster and/or by a housing compartment, the mixer being configured for forming, when the housing is coupled to the base, an outgoing water stream by mixing two incoming water streams, the incoming water streams and the outgoing water stream belonging to said water streams exchanged between the housing and the base, one of the incoming water streams preferentially consisting of the first water stream. Preferentially, the housing is configured for leading through the seat, the incoming water streams from the base to the adjuster, and the outgoing water stream from the adjuster to the base. Preferentially, upon control from the controller, the adjuster adjusts the flow-rate of the incoming water streams so as to determine the proportion of the incoming water streams forming the outgoing water stream.

The further subject matter of the invention relates to a valve system, comprising: the device defined hereinabove, and the base, which comprises the first base opening and the second base opening, the second coupling position being a position wherein the housing is pivoted with respect to the first coupling position, about a main axis of the valve system.

Preferentially, the base comprises a fool proof guide and an obstructing surface, while the breakaway part, when not broken, is arranged for being received in the fool proof guide, when the housing is coupled in the first coupling position and to prevent the coupling of the housing when the housing is in the second coupling position by abutting the breakaway part against the obstructing surface.

Preferentially, the seat comprises a permanent pin, which is off-centered and is received sliding in with respect to the main axis, and the seat comprises a first positioning guide and a second positioning guide, which are off-centered with respect to the main axis, and which are arranged in such a way that, when the housing is in the first coupling position, the permanent pin is received sliding in, in the first positioning guide parallel to the main axis, so as to rotatably fix the housing with respect to the base about the main axis in the first coupling position, and when the housing is in the second coupling position, the permanent pin in the second positioning guide, parallel to the main axis, so as to rotatably fix the housing with respect to the base about the main axis in the second coupling position.

Preferentially, the base comprises a recess, which receives the seat when the housing is coupled to the base, the recess and the seat then defining an interstitial chamber therebetween, and the seat comprises a third seat opening, which is configured for leading a third water stream, among the water streams exchanged between the housing and the base, the third seat opening into the interstitial chamber when the housing is coupled to the base in the first coupling position and when the housing is coupled to the base in the second coupling position.

A further subject matter of the invention is the use of the above-defined device or the above-defined valve system. The use comprises: determining whether the first seat opening is to be fluidically connected to the first base opening or the second base opening. The use comprises: coupling the housing with the base: in the first coupling position, if it has been determined that the first seat opening is to be fluidically connected to the first base opening; or after breaking the breakaway part, in the second coupling position, if it has been determined that the first seat opening is to be fluidically connected to the second base opening.

If it has been determined that the first seat opening is to be fluidically connected to the first base opening, the housing is coupled to the base in the first coupling position, preferentially without breaking the breakaway part, and, if it has been determined that the first seat opening is to be fluidically connected to the second base opening, the housing is coupled to the base in the second coupling position, after breaking the breakaway part so that the coupling can take place in the second coupling position.

The invention will be better understood upon reading the description hereinafter, given only as an example, but not limited to, and making reference to the drawings listed hereinafter.

FIGS. 1 to 4 show a device according to the invention, which herein is in the form of a cartridge.

FIG. 5 shows a base to which a housing 1 belonging to the device is intended to be coupled. Together, the device and the base form a valve system according to the invention, which is preferentially for plumbing use, being connected to a sanitary water network via the base, e.g. for a house or for professional premises.

The valve system preferentially consists of a wall system, the base being designed for being partially embedded in a wall, or more generally in a masonry wall, whatever the orientation thereof. The valve system is preferentially a mixer tap for a shower or a bathtub, the base being e.g. designed for feeding a shower head, a rainfall shower head and/or a bathtub spout. In a variant, the base forms the base of a sink or washbasin faucet, the faucet further including a washbasin spout.

Figure 4:
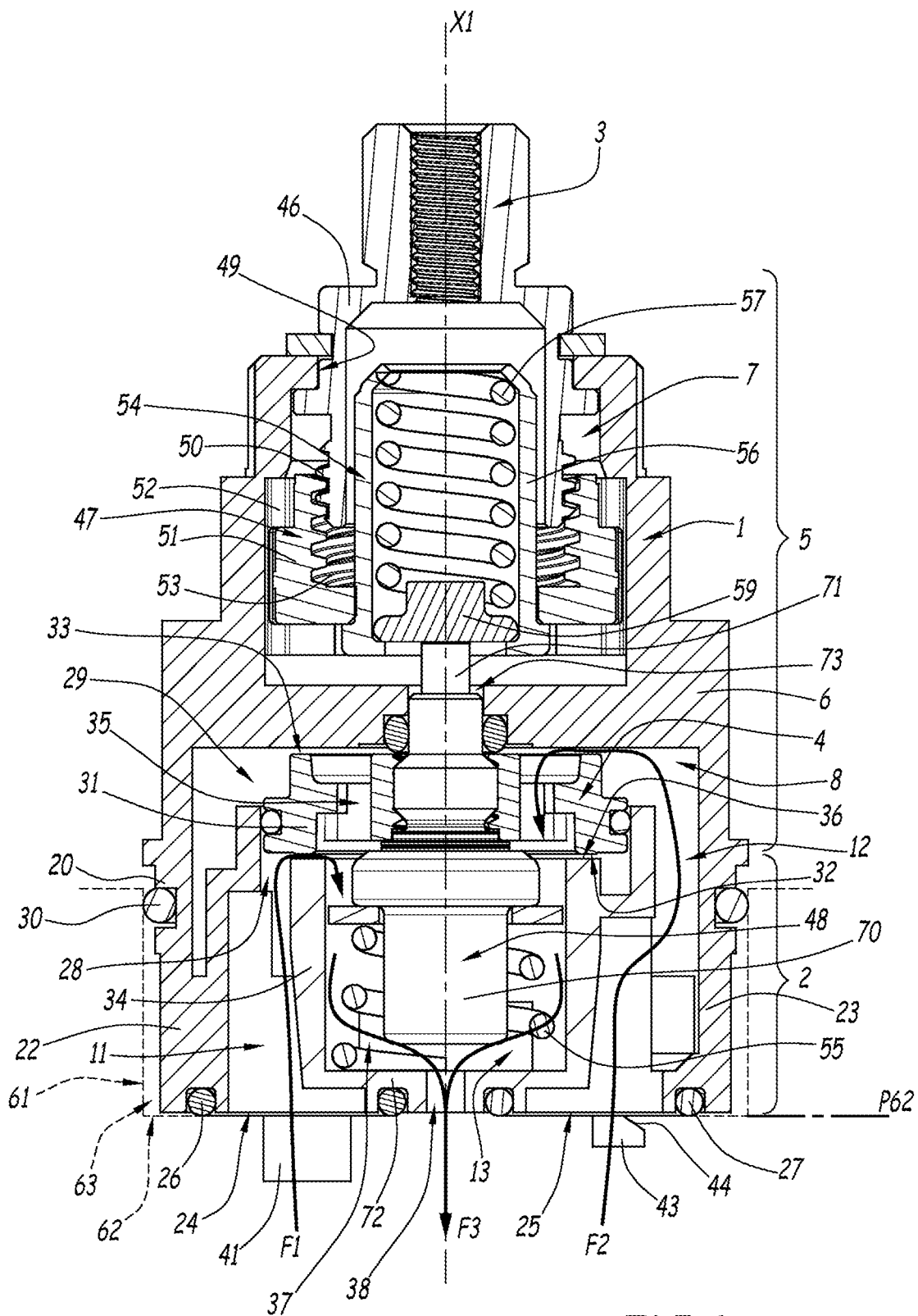
FIG. 4 is a longitudinal section view of the device shown in the previous figures.

As shown in FIGS. 1 to 4, the device comprises a controller 3, as well as a housing 1 with a seat 2. As can be seen in FIG. 4, the device comprises an adjuster 4, contained in the housing 1. The housing 1 is designed for housing the flow of a water stream, herein the water streams F1, F2 and F3, which are exchanged with the base when the device is coupled to said base, via the seat 2 which serves as an interface for the exchange of all the water streams of the device with the base, herein the streams F1, F2 and F3.

The device defines a primary axis X1, fixed with respect to the housing 1, and which crosses through the seat 2. Preferentially, the axis X1 also crosses through the controller 3. Preferentially, the axis X1 also crosses through the adjuster 4, which is placed axially between the controller 3 and the seat 2.

The base defines a main axis X0 of the valve system. When the device is coupled to the base, the axes X0 and X1 coincide.

Unless otherwise stated, expressions such as "radial", "axial" and "coaxial" in relation to the device, refer to the primary axis X1, and expressions such as "radial", "axial" and "coaxial" in relation to the base, refer to the main axis X0.

Figure 1:
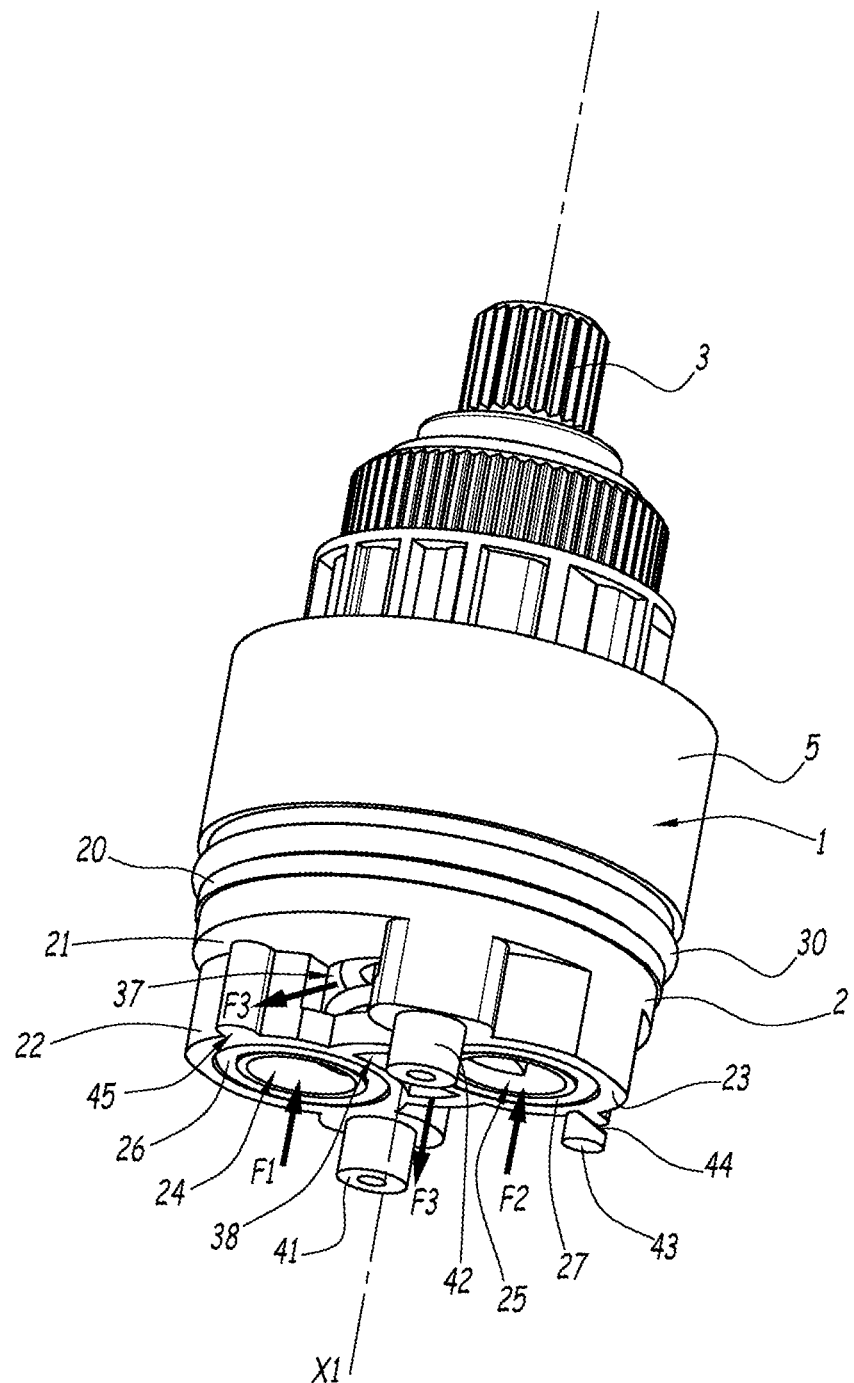
FIG. 1 is a perspective view of a device, belonging to a valve system according to the invention.
Figure 2:
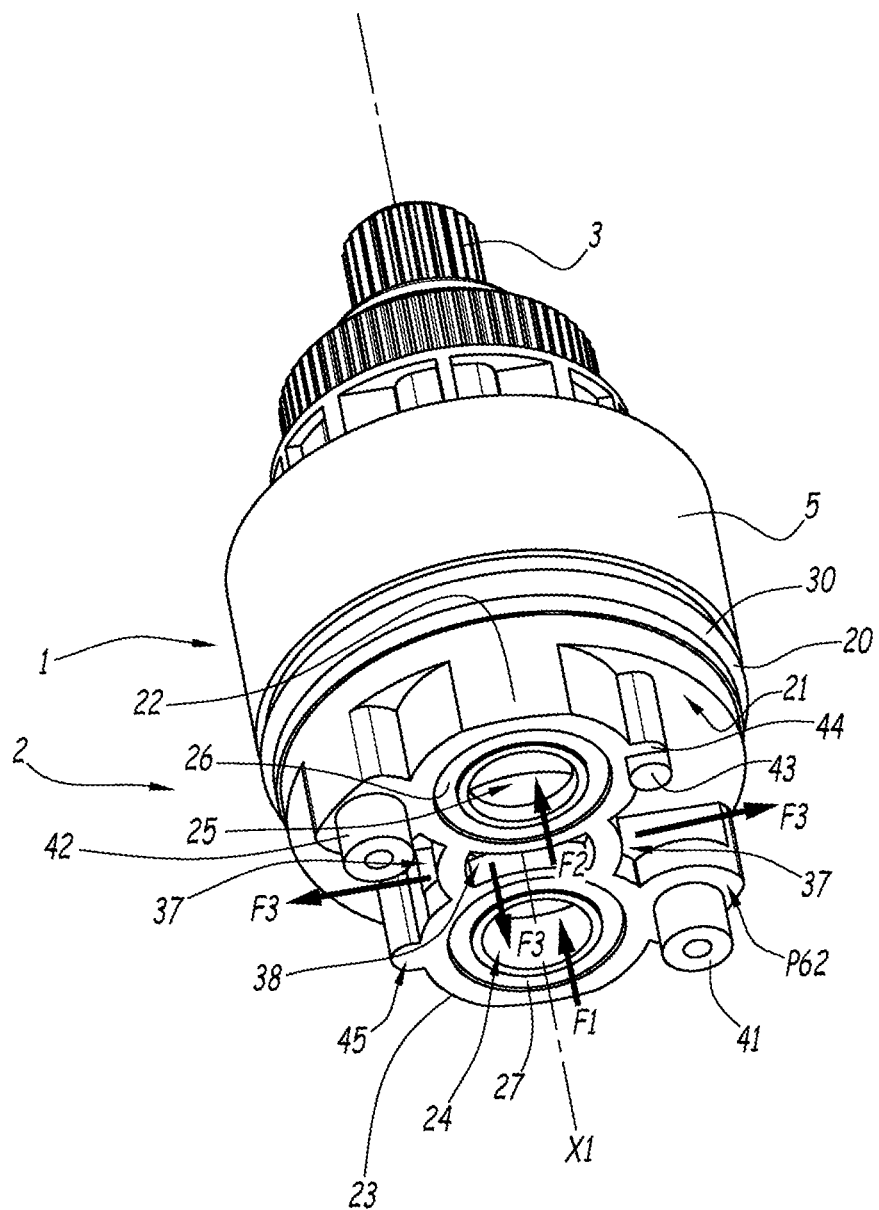
FIG. 2 is a perspective view, from another angle, of the device shown in FIG. 1.
Figure 3:
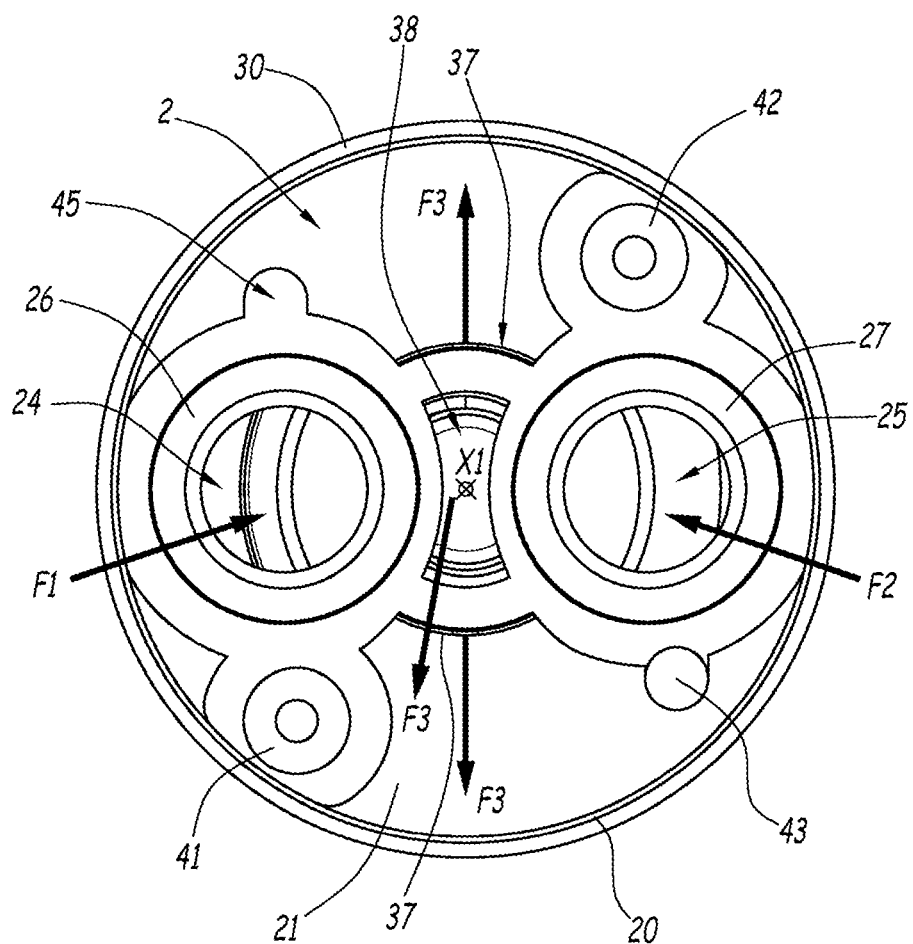
FIG. 3 is a bottom view of the device shown in the previous figures.

The seat 2 forms a first axial end of the housing 1, which is oriented downwards in FIGS. 1, 2 and 4. The housing 1 further comprises a cover 5, which forms a second axial end of the housing 1, opposite the first end and crossed by the controller 3. The second end of the housing 1 is shown at the top of FIGS. 1, 2 and 4. The seat 2 and the cover 5 extend successively along the axis X1 and together form the entire outer envelope of the housing 1.

Preferentially, as can be seen in FIGS. 1 to 4, the housing 1 has, on the outside, a general shape of revolution about the primary axis X1, which is the case for the seat 2 and the cover 5. To this end, a part of the seat 2 and the cover 5 form an external peripheral wall of the housing 1, surrounding the axis X1. Between the axial ends of the housing 1, the seat 2 and the cover 5 form e.g. a succession of cylindrical walls along the axis X1, which are all centered on the axis X1.

Inside, the housing 1 advantageously comprises a transverse partition 6, which is preferentially orthogonal to the axis X1 and crossed by the axis X1. The partition 6 occupies a cross-section of the cover 5. The partition 6 thus divides the housing 1 into a compartment 7, called the "controller compartment", containing the essential part of the controller 3 and into a compartment 8, called the "mixing compartment", containing the essential part of the adjuster 4.

The compartment 8 is delimited by the partition 6, the seat 2 and a part of the cover 5 which extends axially between the seat 2 and the partition 6. The axis X1 crosses through the compartment 8.

The compartment 8 is designed for leading the flow of the water streams F1, F2 and F3. Preferentially, no water stream flows through the compartment 7, the partition 6 being designed for separating the compartments 7 and 8 in a sealed manner.

In the present example, as discussed in detail below, the adjuster 4 and the compartment 8 together form a mixer which, when the housing 1 is coupled to the base, is configured for forming the outgoing water stream F3, by mixing the streams F1 and F2 which entered the housing 1. The housing 1 comprises an inlet chamber 11 for leading the water stream F1, which is an incoming water stream within the housing 1, from the base to the adjuster 4. The housing 1 comprises an inlet chamber 12 for leading the water stream F2, which is another incoming water stream within the housing 1, from the base to the adjuster 4. The housing 1 comprises an outlet chamber 13 for leading the water stream F3, which is an outgoing water stream within the housing 1, from the adjuster 4 to the base. The chambers 11, 12 and 13 form together the compartment 8, for mixing the streams F1 and F2 and thus form the stream F3, with the contribution of the adjuster 4.

Preferentially, the device is designed so that the stream F1 is an incoming flow of hot water while the stream F2 is an incoming flow of cold water. "Cold water" means unheated running water, which is generally at a temperature slightly less than or equal to room temperature. Hot water means running water which has been heated by a plumbing heating system. More generally, hot water has a higher temperature than cold water. Henceforth, the water stream F3 resulting from the mixing of the streams F1 and F2 by the mixer, is at an intermediate temperature between the temperatures of the streams F1 and F2, which depends on the proportion of the streams F1 and F2 for mixing. The stream F3 can be qualified as a mixed water stream and the device can be qualified as a mixing device.

In the present example, the seat 2 advantageously comprises a ring 20 and a bottom wall 21. The seat 2 is attached to the cover 5 by means of the ring 20. The ring 20 forms a peripheral wall of the housing 1, which has a general shape of revolution about the axis X1, i.e. which is centered on the axis X1. The bottom wall 21 is a transverse wall, e.g. a wall orthogonal to the axis X1, which occupies the cross-section of the ring 20 so as to close the housing 1 at one of the axial ends thereof. More generally, the seat 2 closes the housing 1 at one of the axial ends thereof.

Figure 5:
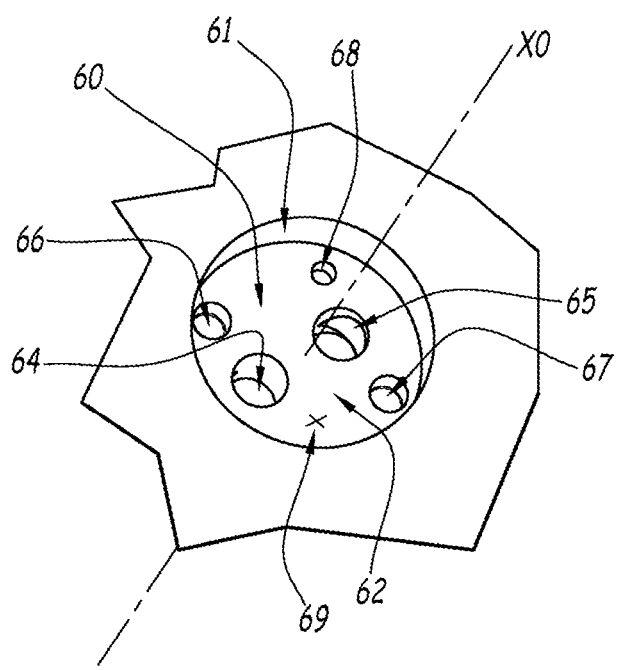
FIG. 5 is a partial perspective view of a base, belonging to the valve system, on which a housing of the device can be coupled.

The seat 2 forms a male part which is entirely received in a recess 60 formed by the base, forming a female part, when the housing 1 is coupled to the base. As shown in FIG. 5, the recess 60 of the base comprises e.g. a peripheral wall 61 having a shape of revolution about the axis X0, i.e. being centered on the axis X0, and a bottom wall 62, which is transverse while being orthogonal to the axis X0, occupying a section of the peripheral wall 61. The walls 61 and 62 are shown diagrammatically with a dotted line in FIG. 4, in a configuration wherein the housing 1 is coupled to the base. When the housing 1 is coupled to the base, the axes X1 and X0 are coaxial.

In particular, the device comprises a peripheral sealing gasket 30, of circular shape, such as an O-ring, which is centered on the axis X1. The gasket 30 is supported by the ring 20, by surrounding the ring 20. When the housing 1 is coupled to the base, the gasket 30 is in radial contact with the wall 61 so as to provide a watertight seal of the coupling. The recess 60 which opens out when the housing 1 is not coupled, is sealed off by the seat 2 when the housing 1 is coupled, due to the fact that the gasket 30 is interposed radially between the seat 2 and the wall 61. In the coupling configuration, the seat 2 and the recess 60 delimit together an interstitial chamber 63. Water tightness between the chamber 63 and the outside of the valve system is provided by the gasket 30.

The bottom wall 62 of the base has a water inlet opening 64 and a water inlet opening 65. The openings 64 and 65 are "base openings", which bring water streams to the device.

The seat 2 advantageously comprises a duct 22 which protrudes from the bottom wall 21 and delimits a part of the chamber 11. The duct 22 extends e.g. parallel to the axis X1. The duct 22 ends in an opening 24, called "seat opening", which opens out onto the outside of the housing 1. When the housing 1 is coupled with the base in a first coupling position, the seat opening 24 is fluidically connected with the base opening 64, which puts the chamber 11 in communication with the base opening 64. By the match between the seat 2 and the base, the fact of coupling the housing 1 with the base in the first coupling position, automatically connects the openings 24 and 64. In order to provide the sealing of said connection, the device advantageously comprises a sealing gasket 26, called the "internal sealing gasket", which surrounds the seat opening 24 while being supported by the seat 2. The gasket 26 is axially interposed between the seat 2 and the bottom wall 62 of the base when the housing 1 is coupled to the base, as is schematically shown in FIG. 4. The incoming stream F1 enters the housing 1, in particular, into the chamber 11, via the opening 24 supported by the seat 2. In the first coupling position, the incoming stream F1 is led into the housing 1 through the base opening 64.

The duct 22 delimits a first part of the chamber 11, which is essentially parallel to the axis X1 and which extends from the opening 24 to the bottom wall 21. Between the bottom wall 21 and the partition 6, a second part 28 of the chamber 11 is defined by the housing 1, and advantageously has an annular shape about the axis X1.

The seat 2 advantageously comprises a duct 23 which protrudes from the bottom wall 21 and delimits a part of the chamber 12. The duct 23 extends e.g. parallel to the axis X1. The duct 23 ends in an opening 25, called "seat opening", which opens out onto the outside of the housing 1. When the housing 1 is coupled with the base in the first coupling position, the seat opening 25 is fluidically connected with the base opening 65, which puts the chamber 12 in communication with the base opening 65. By the match between the seat 2 and the base, the fact of coupling the housing 1 with the base in the first coupling position, automatically connects the openings 25 and 65. In order to provide the sealing of said connection, the device advantageously comprises a sealing gasket 27, called the "internal sealing gasket", which surrounds the seat opening 25 while being supported by the seat 2. The gasket 27 is axially interposed between the seat 2 and the bottom wall 62 of the base when the housing 1 is coupled to the base, as is schematically shown in FIG. 4. The incoming stream F2 enters the housing 1, in particular into the chamber 12, via the opening 25 supported by the seat 2. In the first coupling position, the incoming stream F2 is led into the housing 1 through the base opening 65.

The duct 23 delimits a first part of the chamber 12 which is essentially parallel to the axis X1 and which extends from the opening 25 to the bottom wall 21. Between the bottom wall 21 and the partition 6, a second part 29 of the chamber 12 is defined by the housing 1, and advantageously has an annular shape about the axis X1. The annular part 29 of the chamber 12 and the annular part 28 of the chamber 11 are thus coaxial, being nested one inside the other and/or one above the other between the partition 6 and the bottom wall 21. In the present example, the annular part 28 of the chamber 11 is delimited axially by the bottom wall 21, at the periphery thereof by the annular part 29 of the chamber 12, and internally by a wall 34, which preferentially has a shape of revolution, or a cup shape, about the axis X1. In the example, the annular part 29 of the chamber 12 is delimited axially by the partition 6, internally by the annular part 28 of the chamber 11, and externally by the cover 5.

Preferentially, the device defines a plane P62 which is orthogonal to the axis X1. The seat openings 24 and 25 belong to the plane P62 and are thus mutually coplanar. The gaskets 26 and 27 extend along the plane P62 and are thus mutually coplanar. The ducts 22 and 23 extend right to the plane P62. When the housing 1 is coupled to the base, the plane P62 and the bottom wall 62 of the base are coplanar. Henceforth, reciprocally, the base openings 64 and 65 belong to the plane P62 when the housing 1 is coupled, and are mutually coplanar.

Advantageously, the ducts 22 and 23 are mutually symmetrical about the axis X1, as well as, preferentially, the corresponding openings 24 and 25.

The chambers 11 and 12 both open onto a slide valve 31 belonging to the adjuster 4. The drawer 31 is disposed in the compartment 8 at a place where the chambers 11 and 12 converge. The slide valve 31 has e.g. the shape of a disc perpendicular to the axis X1, so as to have two opposite axial faces 32 and 33, the axial face 33 being oriented towards the partition 6. More particularly, the annular part 28 opens onto the face 32 while the annular part 29 opens onto the face 33.

Whatever the embodiment of the chambers 11 and 12, the purpose thereof is to fluidically connect, correspondingly, the seat openings 24 and 25 to the adjuster 4, herein to the slide valve 31, so that the streams F1 and F2 reach the adjuster 4, more particularly the slide valve 31.

The slide valve 31 is movable with respect to the housing 1 so as to adjust the flow-rate of the streams F1 and F2. As shown in FIG. 4, the slide valve 31 is e.g. movable with respect to the housing 1, along a translation parallel to the axis X1. The slide valve 31 is movable to a first position, here downwards, where the stream F1 is completely interrupted, so as to have a zero flow-rate, and where the stream F2 is not limited, so as to have a maximum flow-rate. In the first position, the slide valve 31 closes the chamber 11 whereas the chamber 12 is left fully open. The chamber 12 is left open by forming an annular gap between the partition 6 and the axial face 33 of the slide valve 31. The chamber 11 is closed by closing an annular gap between the face 32 of the slide valve 31 and an upper edge 36 of the wall 34, the edge 36 delimiting the opening of the chamber 11 on the slide valve 31. Axially, the edge 36 is preferentially placed between the partition 6 and the bottom wall 21. The slide valve 31 is movable right to a second position, herein upwards, where the stream F2 is completely interrupted, so as to have a zero flow-rate, and where the stream F1 is not limited, so as to have a maximum flow-rate. In the second position, the slide valve 31 closes the chamber 12 whereas the chamber 11 is left fully open. The chamber 12 is closed by the abutment of the axial face 33 of the slide valve 31 against the partition 6. The chamber 11 is left fully open by opening the gap between the axial face 32 of the slide valve 31 and the upper edge 36 of the wall 34. In FIG. 4, the slide valve 31 is shown in an intermediate position where the streams F1 and F2 are limited substantially equally by the slide valve 31 to an intermediate flow-rate between the zero flow-rate and the maximum flow-rate. In such intermediate position, each of the chambers 11 and 12 is partially closed by the slide valve 31 in a substantially even way.

Advantageously, the position of the slide valve 31 limits the flow-rates of the streams F1 and F2 in an opposing manner, or inversely proportional, or else in such a way that the sum of the flow-rates of the streams F1 and F2 is substantially constant for any position of the slide valve 31. In other words, the adjuster 4 is preferentially designed for adjusting the flow-rates of the streams F1 and F2 in an inverse manner, which makes it possible to define, in an adjustable way, the proportions of the mixture of the streams F1 and F2, i.e. the proportion of the stream F1 and of the stream F2 in the composition of the stream F3. In other words, the slide valve 31 allows the adjuster 4 to adjust the flow-rate of the incoming water streams F1 and F2, so that the adjuster 4 can be used for obtaining a mixture with a variable proportion, i.e. adjustable, for the stream F3. In fact, the proportion of the streams F1 and F2 in the formation of the stream F3 is modified by the adjuster 4, in particular as a function of the position of the slide valve 31, which advantageously influences the temperature of the stream F3 thus obtained.

For mixing the streams F1 and F2, the chambers 11 and 12 converge in the chamber 13 at the adjuster 4, in particular at the slide valve 31. Herein, the chamber 13 is delimited by the wall 34 and is thus centered on the axis X1, being coaxial with the annular parts 28 and 29 of the chambers 11 and 12. More particularly, the chamber 13 is surrounded directly by the chamber 11. The edge 36 advantageously defines a closed contour about the axis X1, preferentially circular and centered on the axis X1, and forms an open axial end of the chamber 13, for connecting the chamber 13 with the chambers 11 and 12. The open axial end is oriented towards the slide valve 31.

The chamber 11 opens into the chamber 13, preferentially directly. Herein, the chamber 11 opens into the chamber 13 directly via the gap provided between the face 32 of the slide valve 31 and the edge 36 of the wall 34. The chamber 12 opens into the chamber 13, preferentially via the slide valve 31. More precisely, the chamber 12 opens into the chamber 13 via the gap provided between the face 33 of the slide valve 31 and the partition 6, then via gills 35 provided through the slide valve 31, each gill 35 connecting the face 33 to the face 32, whereas the face 32 delimits the chamber 13 with the wall 34. From the chamber 12, the stream F2 thus preferentially reaches the chamber 13 by crossing through the slide valve 31.

In the chamber 13, the streams F1 and F2 mix and together become the stream F3 at the open axial end of the chamber 13 delimited by the edge 36. The chamber 13 can thus be called a "mixing chamber", housing the mixing between the streams F1 and F2, following the adjustment of the proportions of the mixture by the adjuster 4, herein the slide valve 31.

As can be seen more clearly in FIGS. 1 and 2, the chamber 13 includes at least one seat opening. Each seat opening of the chamber 13 is preferentially arranged beyond the bottom wall 21, with respect to the edge 36, i.e. between the bottom wall 21 and the plane P62. e.g., among the seat openings, the chamber 13 has two radial seat openings 37 and an axial seat opening 38. The openings 37 and 38 are formed between the two ducts 22 and 23.

Each opening 37 advantageously extends between the bottom wall 21 and the plane P62 of the housing 1 where the seat openings 24 and 25 are formed. The openings 37 are advantageously diametrically opposed around the axis X1, or at least regularly distributed about the axis X1, e.g. in the same plane orthogonal to the axis X1. In other words, preferentially, the openings 37 are mutually symmetrical about the axis X1. When reference is made to a symmetry about an axis, it means, unless otherwise stated, a symmetry of rotation about the axis, i.e. an invariance in rotation about the axis, of an angle of 180°.

The opening 38 advantageously belongs to the plane P62, i.e. the opening 38 is coplanar with the openings 24 and 25. The opening 38 is centered on the axis X1.

In a variant, it would be possible to provide for the chamber 13 to have a single seat opening, or a number of seat openings other than two.

When the housing 1 is coupled onto the base, each seat opening 37 and 38 opens into the interstitial chamber 63 delimited between the seat 2 and the recess 60 of the base. The stream F3 coming out from the seat 2 is received in the interstitial chamber 63. The chamber 63 is crossed by the streams F1 and F2, yet the streams F1 and F2 are fluidically separated from the chamber 63, since the connection of the seat openings 24 and 25, respectively, with the base openings 64 and 65, is sealed by the gaskets 26 and 27. In other words, a watertight seal is provided for separating the interstitial chamber 63 from the connection between the seat openings 24 and 25 and the base openings 64 and 65. In other words, the chamber 63 is placed annularly around the openings 24 and 25, the gaskets 26 and 27 delimiting the chamber 63 from the inside. The stream F3 is then discharged from the interstitial chamber 63 via one or more openings belonging to the base, not shown, which opens into the chamber 63. Each of the openings is provided e.g. in the peripheral wall 61 or in the bottom wall 62.

Provision is made for the seat openings 24 and 25 to be arranged so as to be distributed regularly about the axis X1. Herein, since there are only two openings 24 and 25 forming inlet seat openings for leading incoming streams, the regular distribution about the axis X1 means that the openings 24 and 25 are diametrically distributed about the axis X1. More precisely, the openings 24 and 25 are mutually symmetrical about the axis X1.

Similarly, provision is made for the base openings 64 and 65 to be arranged by being distributed regularly about the axis X0. Herein, since there are only two openings 64 and 65 forming inlet seat openings for leading incoming streams, the regular distribution about the axis X0 means that the openings 64 and 65 are diametrically distributed about the axis X0. More precisely, the openings 64 and 65 are mutually symmetrical about the axis X0.

The controller 3 determines the adjustment of the adjuster 4, i.e. the position of the slide valve 31 with respect to the housing 1. Herein, it is in this way possible to determine the proportion of the streams F1 and F2 forming the stream F3.

The controller 3 preferentially comprises a controller component 46, which is designed for being actuated by an end user in order to control the adjuster 4, once the valve system has been installed. The controller 3 further comprises a mechanical transmission 47 which mechanically links the position of the controller component 46 to the position of the slide valve 31 with respect to the housing 1. Optionally, the mechanical transmission 47 comprises a thermal actuator 48 which makes it possible to influence the adjustment of the adjuster 4, in addition to the adjustment imposed by the controller component 46, e.g. depending upon the temperature of the outgoing stream F3. Preferentially, if the thermal actuator 48 is provided, the mechanical transmission 47 comprises an overtravel damper 54.

The compartment 7, crossed by the axis X1, is delimited by the partition 6, a part of the cover 5 which extends between the partition 6 and the axial end of the housing 1 opposite the seat 2. The partition 6 separates the compartment 7 from the compartment 8. The axial end of the housing 1 includes an upper opening 49 crossed by the axis X1, preferentially being centered on the axis X1, and which thus puts the compartment 7 in communication with the outside of the housing 1. More precisely, the opening 49 is provided through the cover 5, axially opposite the partition 6 and the seat 2.

The controller component 46 closes the opening 49, so that part of the component 46 protrudes outside the housing 1 and another part of the component 46 is received inside the compartment 7. More generally, provision is made for a part of the controller 3 to protrude outside the housing 1, herein the controller component 46, at the axial end of the housing 1 which is opposite the seat 2, crossing through said axial end of the housing 1. It is through the protruding part, herein the component 46, that the user can actuate the controller 3 for controlling the adjuster 4.

In the present case, for the protruding part thereof, the component 46 forms an adjustment knob which can be actuated by the user. The component 46 can pivot with respect to the housing 1, preferentially about the axis X1. The pivoting is advantageously supported by the opening 49. Preferentially, with respect to the housing 1, the component 46 pivots only about one axis, herein the axis X1.

The mechanical transmission 47 transforms the pivoting movement of the component 46 into a translational movement of the slide valve 31 with respect to the housing 1 parallel to the axis X1.

To this end, the transmission 47 preferentially comprises a screw-nut system. The screw-nut system e.g. comprises a thread 50 formed on the component 46 in the compartment 8, which is coaxial with the axis X1. The screw-nut system further comprises a nut 51 contained in the compartment 8. The nut 51 is guided in translation by the cover 5 parallel to the axis X1, while being prevented from rotating with respect to the housing 1 about the axis X1, e.g. by means of axial splines 52 supported by the cover 5 and the nut 51. The nut 51 further comprises a central opening coaxial with the axis X1, receiving therefor within the part of the controller component 46 bearing the thread 50. In the central opening, the nut 51 has a thread 53 engaged with the thread 50, so as to link the rotational position of the controller component 46 to the translational position of the nut 51.

In the case (not shown) where the overtravel damper 54 and the thermal actuator 48 are not provided, provision can be made for the nut 51 and the slide valve 31 to be fixed with respect to each other, so as to be mutually connected in translation with respect to the housing 1. The translation of the nut 51 then directly reflects the translation of the slide valve 31 with respect to the housing 1, along the axis X1. For this purpose, provision is made e.g. for the nut 51 to be directly attached to the slide valve 31 through the partition 6, e.g. by means of a rod connecting the nut 51 to the slide valve 31 and crossing through the partition 6.

In the case illustrated in FIG. 4, the nut 51 is preferentially linked in translation with the slide valve 31 via the overtravel damper 54 and the thermal actuator 48.

Preferentially, the overtravel damper 54 is entirely placed in the housing compartment 7. The overtravel damper 54 comprises an overtravel spring 57. The overtravel spring 57 is e.g. a compression spring, compressible axially parallel to the axis X1. Advantageously, provision is made that the overtravel spring 57 is arranged coaxially with the axis X1, e.g. in the central opening of the nut having the thread 53. At a first end, the overtravel spring 57 bears axially against the nut 51, by means of a sleeve 56 belonging to the damper 54, the sleeve 56 being attached to the nut 51. The sleeve 56 has e.g. a geometry of revolution about the axis X1. In detail, the sleeve 56 is received in the central opening of the nut by being radially placed between the spring 57 and the nut 51. The thread 50 of the component 46 is carried by a tubular part of the component 46, which is radially placed between the sleeve 56 and the nut 51, and which is coaxial with the axis X1. In other words, an axial end of the sleeve 56 is received inside the tubular part of the component 46. The spring 57 bears axially against the end of the sleeve 56, through the inside of the sleeve 56.

At a second end of the spring 57 opposite the first, the spring 57 bears axially on the thermal actuator 48 via a slide 59 of the damper 54. The slide 59 is received in the sleeve 56 by sliding parallel to the axis X1, with respect to the sleeve 56.

Herein, the thermal actuator 48 is in the form of a thermostatic element, comprising a heat-sensitive part 70, a movable part 71 and an elastic return spring 55. The heat-sensitive part 70, depending upon the temperature, is apt to produce a displacement of the movable part 71, sliding with respect to the heat-sensitive part 70, herein in translation parallel to the axis X1. For this purpose, preferentially, the heat-sensitive part 70 comprises a cup, which has an opening coaxial with the axis X1 and which encloses a heat-expandable material such as a heat-expandable wax, which expands when the temperature rises and which retracts when the temperature drops, in a reversible way. The movable part 71 is advantageously in the form of a rod coaxial with the axis X1, which closes the opening of the cup, the opening of the cup guiding the sliding of the movable part 71 with respect to the heat-sensitive part 70 parallel to the axis X1. The movable part 71 is moved away from the part 70 under the action of the expansion of the heat-expandable material, when the material expands. As explained hereinafter, the spring 55 serves to return the movable part 71 when the part 70 get closer when the material retracts.

More generally, the thermal actuator 48 has a volume, along the axis X1, which depends on the temperature of the water wherein the heat-sensitive part 70 is immersed.

The thermal actuator 48 crosses through the partition 6 via an opening 73 in the partition 6 which is e.g. coaxial with the axis X1. The opening 73 is preferentially sealed by the thermal actuator 48, more particularly by the heat-sensitive part 70. For this purpose, a sealing gasket is advantageously provided which is interposed radially between the thermal actuator 48 and the opening 73. The sealing gasket e.g. surrounds the heat-sensitive part 70, as shown in FIG. 4. Thus, watertightness is obtained between the compartments 7 and 8, the water streams flowing exclusively in the compartment 8 while the compartment 7 is preferentially entirely out of water.

All of the heat-sensitive part 70, or most of the heat-sensitive part 70, extends into the compartment 8, more particularly into the chamber 13. The heat-sensitive part 70 is thus immersed in the stream F3. Thus arranged, the heat-sensitive part 70 displaces the movable part 71 as a function of the temperature of the stream F3 circulating in the chamber 13.

An axial end of the movable part 71 extends into the compartment 7 and bears axially against the slide 59, i.e. against the overtravel spring 57. More generally, the thermal actuator 48 bears axially against the nut 51, the axial bearing taking places herein by means of the overtravel damper 54.

On the other hand, the return spring 55 is axially interposed between the heat-sensitive part 70 and the housing 1, more particularly an armature 72 belonging to the housing, which partly delimits the chamber 13. Herein, the return spring 55 is preferentially entirely received into the chamber 13, e.g. being placed coaxially with the axis X1. More particularly, the reinforcement 72 belongs to the wall 34 and partly delimits the seat openings 37 and 38. Preferentially, the reinforcement 72 extends along the plane P62.

The movable part 71 of the thermal actuator 48 is thus linked in translation with the nut 51 by means of the damper 54. The heat-sensitive part 70 is thus axially interposed between the movable part 71 and the return spring 55, so as to move in translation with respect to the nut 51 along the axis X1 depending upon the temperature of the stream F3.

When the temperature of the stream F3 drops, leading to a retraction of the heat-expandable material of the heat-sensitive part 70, the return spring 55 returns the movable part 71 towards the heat-sensitive part 70 along the axis X1, since the heat-sensitive part 70 and the movable part 71 are axially interposed between the nut 51 and the return spring 55.

Provision is made for the overtravel spring 57 to apply a return force which is greater than the return force applied by the return spring 55, so that the return spring 55 is not sufficient for compressing the overtravel spring 57. Thus, the overtravel damper 54, more particularly the overtravel spring 57, is designed for being compressed only when the expansion of the thermal actuator 48 exceeds a predetermined threshold along the axis X1, i.e., when the movable part 71 is displaced in translation towards the nut 51 beyond a certain limit, in order to prevent the mechanism from breaking. In other words, the overtravel damper 54 is designed for absorbing an overtravel of the thermal actuator 48.

The slide valve 31 is fastened to the thermal actuator 48, more particularly to the heat-sensitive part 70 in the compartment 8. Henceforth, the heat-sensitive part 70 and the slide valve 31 are rigidly attached in translation with respect to the housing 1 along the axis X1. Preferentially, the slide valve 31 surrounds the heat-sensitive part about the axis X1 and is fastened thereto by screwing.

The position of the controller component 46, herein rotating about the axis X1 with respect to the housing 1, determines the position of the slide valve 31 by means of the mechanical transmission 47. When the controller 46 is moved in one direction, the slide valve 31 is translated away from the partition 6 so as to reduce the flow-rate of the stream F1 while increasing the flow-rate of the stream F2. When the controller 46 is moved in the opposite direction, the slide valve 31 is translated towards the partition 6 so as to reduce the flow-rate of the stream F2 while increasing the flow-rate of the stream F1.

The transmission 47, using the thermal actuator 48, corrects the position of the slide valve 31 according to the temperature of the stream F3. More generally, the thermal actuator 48 thermally regulates the mixing of the streams F1 and F2.

In detail, when the temperature of the stream F3 increases, the thermal actuator 48 expands parallel to the axis X1, herein under the action of an expansion of the heat-expandable material. In other words, the movable part 71 moves away from the heat-sensitive part 70 by sliding along the axis X1. The heat-sensitive part 70, and thus the slide valve 31, moves away from the partition 6, which tends to reduce the flow-rate of the stream F1 and to increase the flow-rate of the stream F2. Conversely, when the temperature of the stream F3 drops, the thermal actuator 48 retracts parallel to the axis X1, herein under the action of the spring 55 combined with a retraction of the heat-expandable material. In other words, the movable part 71 moves closer to the heat-sensitive part 70 by sliding along the axis X1. The heat-sensitive part 70, and thus the slide valve 31, moves towards the partition 6, which tends to reduce the flow-rate of the stream F2 and to increase the flow-rate of the stream F1.

To require that the coupling of the housing 1 with the base takes place in the first coupling position, where the opening 64 is connected with the opening 24, where the opening 65 is connected with the opening 25 and where the interstitial chamber is formed, with the openings 37 and 38 opening thereto within and the sealing thereof with respect to the outside is provided, the seat 2 matches the base, more particularly the recess 60. In other words, the seat 2 is connected correctly with the base only in one position of the housing 1 with respect to the base, called the first coupling position. In the present example, the first coupling position is a rotational position of the housing 1 with respect to the base, about the axis X0.

The matching between the seat 2 and the base is obtained by a plurality of means.

To match with the base in the first coupling position, the seat 2 comprises at least one pin, herein three pins 41, 42 and 43, each pin cooperating with a respective guide belonging to the base, herein three guides 66, 67 and 68 when the housing 1 is coupled.

Each pin 41, 42 and 43 has e.g. a cylindrical shape with a circular base, centered on an axis which is parallel to the axis X1. Each pin 41, 42 and 43 is a protruding part of the seat 2, which preferentially extends beyond the plane P62 wherein the openings 24 and 25 are defined. Each pin 41, 42 and 43 is e.g. attached to the wall 21. Each pin 41, 42 and 43 is off-center with respect to the axis X1, i.e. it is not coaxial with the axis X1. The pin 41 e.g. extends along the duct 22 while the pin 42 extends along the duct 23. Provision is made e.g. for the pin 43 to extend along the duct 22.

Preferentially, among the pins, at least one permanent pin is distinguished, herein the pins 41 and 42, and at least one breakaway pin, herein the pin 43.

The permanent pins 41 and 42 are regularly distributed about the axis X1. The pins 41 and 42, herein two in number, are mutually symmetrical about the axis X1. "Permanent" means that each pin 41 and 42 is non-breakaway by a fitter, i.e. has no incipient breaking or precut. In other terms, the permanent pin is not expected to be broken by the fitter. "Fitter" refers to the person who installs the valve system.

On the other hand, the breakaway pin 43 is a breakaway part of the seat 2, i.e. a part which can be broken by the fitter, preferentially by hand, or otherwise with a tool. In order to be breakaway, the pin 43 comprises an incipient breaking 44, e.g. in the form of a notch or of a precut. The incipient breaking 44 is provided e.g. along the plane P62. More generally, once broken, provision is advantageously made for the breakaway pin 43 not to extend beyond the openings 24 and 25 along a direction parallel to the axis X1, i.e. same ends at the plane P62. Provision is made for the seat 2, at a symmetrical location about the axis X1 with respect to the breakaway pin 43, to provide a space which is free starting from the plane P62, i.e. comprises e.g. a free surface 45 in the plane P62, oriented towards the bottom wall 62 when the housing 1 is coupled.

Each guide 66, 67 and 68 has a shape and an arrangement for cooperating with one of the pins 41, 42 and 43. It is provided for that e.g. in the first coupling position, the pin 41 is received sliding in by the guide 66, the pin 42 is received sliding in by the guide 67 and the unbroken pin 43 is received sliding in, in the guide 68, parallel to the axis X0. Each guide is advantageously a recessed part of the base, which opens out at the bottom wall 62. Each guide 66, 67 and 68 e.g. has a cylindrical shape with a circular base corresponding to the shape of the respective pin 41, 42 and 43 thereof. Each guide 66, 67 and 68 is off-centered with respect to the axis X0, i.e. not coaxial with the axis X0. The guide 66 e.g. is positioned in the vicinity of the base opening 64, while the guide 67 is positioned in the vicinity of the base opening 65. The guide 68 e.g. is positioned in the vicinity of the opening 65. The guides 66 and 67 receiving the permanent pins 41 and 42 are, like said permanent pins, regularly distributed about the axis X0, preferentially being mutually symmetrical about the axis X0.

The guides, in combination with the permanent pins and also the breakaway pin when same is not broken, form an anti-rotation system, to prevent a rotation of the housing 1 with respect to the base about the axis X0 when the housing is coupled with the base. Such association of pins and guides means that the seat 2 and the base are matching, so that the seat 2 requires that the coupling of the housing 1 with the base takes place in a correct position, in particular the first coupling position described hereinabove. More particularly, in the first coupling position, the axes X0 and X1 coincide, the base opening 24 is fluidically connected to the base opening 64, the seat opening 25 is fluidically connected to the base opening 65 and the interstitial chamber is delimited and made watertight by the gasket 30. In the first position, the housing 1 comes axially into abutment against the base at the plane P62, the openings 24 and 25 being in abutment against the openings 64 and 65, preferentially by means of the gaskets 26 and 27.

When the breakaway pin 43 is broken, the coupling of the housing 1 to the base by means of the seat 2 is authorized according to a second coupling position. When the breakaway pin 43 is broken, it is further possible to couple the housing 1 with the base in the first coupling position. Because of the symmetry of the various above-mentioned elements of the seat 2 and of the base about the axes X1 and X0, the first coupling position and the second coupling position are mutually symmetrical about the axis X0. In the second coupling position, the housing is rotated by 180° about the X0 axis with respect to the first coupling position thereof. More generally, when the breakaway pin 43 is broken, the seat 2 is symmetrical in rotation about the axis X1, at least functionally, i.e. for the parts in contact with the base. The base, except for the guide 68, is preferentially symmetrical in rotation about the axis X0, at least functionally, i.e. for the parts in contact with the seat 2.

In other words, when the pin 43 is not broken, the pin imposes that the coupling takes place only when the housing 1 is in the first coupling position. If the housing 1 were placed in another position, the unbroken breakaway pin 43 would prevent the coupling.

Because of the rotational symmetry thereof about the axis X1, the permanent pins 42 and 43 and the guides 66 and 67 are used for guiding the positioning of the housing according to the second coupling position. For this purpose, in the second coupling position, the pin 41 is received in the guide 67 and the pin 42 is received in the guide 66, inverse to the first coupling position. Since the guides 66 and 67 provide the guiding of the pins for the two coupling positions, same can be considered positioning guides. Since the permanent pins 42 and 43 allow a coupling to take place in the two coupling positions, it is understood that it is the fact whether or not the pin 43 is broken which determines whether the coupling can take place or not for the second position.

In the second coupling position, the seat opening 24 is fluidically connected with the base opening 65, the seat opening 25 is fluidically connected with the base opening 64. In other words, the connections are reversed, which means that the stream F1 is led through the base opening 65 and the seat opening 24, whereas the stream F2 is led through the base opening 64 and the seat opening 25. The above is made possible by the symmetrical arrangement of the openings 24 and 25 about the axis X1 and by the symmetrical arrangement of the openings 64 and 65 about the axis X0. In the second coupling position, the housing 1 axially abuts against the base, the seat openings 24 and 25 axially abutting against the base openings 65 and 64, in particular, via the gaskets 26 and 27.

In the second coupling position, the interstitial chamber 63 is formed, exactly like in the first coupling position. In the second position, the seat 2 closes the recess 60 of the base, preferentially by means of the sealing gasket 30, like for the first coupling position. The above is possible insofar as the ring 20, and more particularly the gasket 30, has a geometry which is symmetrical about the axis X1, and that the peripheral wall 61 receiving radially against same, the ring 20, more particularly the ring 20, comprises a matching geometry, symmetrical about the axis X1. This is e.g. a geometry of revolution about the axes X1 and X0, respectively. In the second coupling position as in the first coupling position, the stream F3 is discharged into the interstitial chamber 63 through the seat openings 37 and 38.

The breakaway pin 43 cooperates with the base, in particular with the guide 68, only when the pin is not broken and only in the first coupling position. Preferentially, in the second coupling position, the guide 68 is left free. It is provided that, at a symmetrical location about the axis X1 with respect to the guide 68, the base has an obstructing surface 69, herein formed by the bottom wall 62. In FIG. 5, the obstructing surface 69 is shown by a cross. In order to prevent coupling according to the second coupling position when the pin 43 is not broken, the pin 43 is arranged so as to abut against the obstructing surface 69 of the base, along a direction parallel to the axis X0. Because of the unbroken pin 43, the housing 1 cannot be axially abutted against the base at a position where the seat openings are connected to base openings. The pin 43, the guide 68 and the obstructing surface 69 thus form a rotational fool proof device for coupling the housing 1 according to the first coupling position, when the pin 43 is not broken. In this respect, the guide 68 can be considered a fool proof guide.

In order for the coupling to take place according to the second coupling position, in addition to the first coupling position, the fitter needs to perform a voluntary action of breaking the breakaway pin 43. The fitter performs such voluntary action only if the water streams coming out from the base openings 64 and 65 are reversed and do not correspond to the streams F1 and F2 which are to be supplied to the device. E.g., whereas the stream F1 must be a hot water stream and F2 a cold water stream for the device to operate, more particularly in relation with the action of the thermal actuator 48 on the adjuster 4 and/or for questions of correspondence with graduations present on the controller component 46, the fitter has the possibility of coupling the housing 1 in the second coupling position, by breaking the breakaway pin 43 beforehand, if the fitter knows that the base opening 64 is a cold water inlet and that the base opening 65 is a hot water inlet.

More generally, at installation, it is intended to use the device and the base by first determining whether the seat opening 24 has to be fluidically connected to the base opening 64 or to the base opening 65, and if the seat opening 25 has to be fluidically connected to the base opening 65 or to the base opening 64. In other words, it is suitable to determine whether to couple the housing in the first or in the second coupling position. Herein, the above is determined by knowing which seat openings are to receive cold or hot water, and knowing which base openings let through cold and hot water.

If it has been determined that the first coupling position is suitable, then the housing 1 is coupled in the first coupling position without breaking the pin 43. If, on the other hand, it has been determined that the coupling is to be carried out in the second coupling position, the breakaway pin 43 is broken and the housing 1 is then coupled to the base in the second coupling position.

In a variant, rather than being a cartridge, the device is directly a tap body, the housing 1 then preferentially forming an outer facing envelope.

Alternatively or additionally to the adjustment of the proportion of the incoming streams F1 and F2, the adjuster 4 is a flow adjuster of the outgoing stream F3. For this purpose, the adjuster comprises, in an additional or alternative way to the slide valve 31, a pair of ceramic disks. The controller 3 is advantageously in the form of a single controller, for adjusting both the flow-rate and the temperature of the stream F3, the adjuster adjusting the respective flow-rate of the streams F1 and F2 so as to obtain the stream F3 at the desired temperature and flow-rate.

In a variant, provision is made for the controller component 46 to be in the form of a lever, pivoting about one or a plurality of axes with respect to the housing 1. If the controller 3 is a single controller, it is preferable for the controller component 46 to be a lever which pivots about two different axes with respect to the housing 1, one for controlling the flow-rate of the stream F3, the other for controlling the mixing ratio of the streams F1 and F2.

In a variant, the device comprises only two seat openings, one of which leads an incoming water stream and the other leads an outgoing water stream, the outgoing water stream being formed entirely by the incoming water stream. In such a case, the adjuster is e.g. an adjuster of the flow-rate of the outgoing water stream by adjusting the flow-rate of the incoming water stream. In such a case, preferentially, in the first coupling position, the first seat opening connects to a first base opening and the second seat opening connects to a second base opening, and in the second coupling position, the first seat opening connects to the second base opening and the second seat opening connects to the first base opening.

In a variant, the seat opening which connects to a first base opening in the first coupling position and to a second base opening in the second coupling position is provided as an outlet seat opening for an outgoing stream.

In a variant, a single seat opening is provided, which can be provided for leading an incoming water stream or an outgoing water stream, and which, depending on whether the housing is in the first or the second coupling position, is connected to a first base opening or to a second base opening.

According to another embodiment (not shown), a device for a valve system could be provided, comprising a housing, with a base, by means of which the housing is designed for being coupled to a base, for exchanging a water stream between the base and the housing through the seat, the seat matching the base so as to impose that the coupling of the housing with the base takes place only when the housing is in a first coupling position with respect to the base. In such embodiment, the seat has a first seat opening for leading a first water stream, a second seat opening for leading a second water stream and a third seat opening for leading a third water stream, the three seat openings being regularly distributed around a primary axis of the housing crossing through the seat, being separated by an angle of 120°. More precisely, each seat opening is symmetrical with the previous seat opening about the primary axis, by an angle of 120°. Additionally, the base includes a first base opening, a second base opening and a third base opening for supplying said water streams, which are mutually symmetrical at an angle of 120° about a main axis of the base, with which the primary axis is merged when the housing is coupled with the base. According to such embodiment, the device comprises an adjuster, which is contained inside the housing for adjusting the flow-rate of at least one of said water streams. In the first coupling position, the first seat opening connects with the first base opening, the second seat opening connects with the second base opening, and the third seat opening connects with the third base opening. In a second coupling position, permitted only if a breakaway part of the seat is broken, the first seat opening connects with the second base opening, the second seat opening connects with the third base opening and the third seat opening connects with the first base opening. The second coupling position is thus a 120° rotation about the axis X0 with respect to the first coupling position. Such other embodiment illustrates that the geometric arrangement of the seat openings and the base openings can be used for switching more than two seat openings with respect to the base openings. Thus, such embodiment provides for a case wherein the second seat opening is not connected with the first base opening, but with a third base opening, during a coupling in the second coupling position.

Each feature described hereinabove for one embodiment or a variant can be applied to any other embodiment and variant described hereinabove, insofar as technically feasible.

The invention claimed is:

1. A device for a valve system, comprising:
   a housing which comprises a seat, by means of which the housing is designed for being coupled to a base, for an exchange of water streams between the base and the housing through the seat, the seat matching the base so as to impose that the coupling of the housing with the base takes place only when the housing is in a first coupling position with respect to the base, the seat comprising a first seat opening, configured for:
      leading a first water stream, among said water streams, and
      fluidically connecting to a first seat opening, belonging to the seat, when the housing is coupled to the seat in the first coupling position, so that the first water stream is led through the first seat opening;
   an adjuster, which is contained within the housing for adjusting the flow-rate of at least one of said water streams; and
   a controller, which protrudes from the housing and controls the adjuster;
   wherein:
      the seat comprises a breakaway part which is configured for being broken from the seat so that coupling of the housing to the base can take place when the housing is in a second coupling position with respect to the base; and
      the first seat opening is configured for fluidically connecting to a second base opening belonging to the base when the housing is coupled with the base in the second coupling position, so that the first water stream is led through the second base opening.

2. The device according to claim 1, wherein the seat comprises a second seat opening, which is configured for:
   leading a second water stream, among said water streams, and
   fluidically connecting to the second base opening when the housing is coupled with the base in the first coupling position, so that the second water stream is led through the second base opening.

3. The device according to claim 2, wherein the second seat opening is configured for fluidically connecting to the first base opening when the housing is coupled to the base in the second coupling position, so that the second water stream is led through the first base opening.

4. The device according to claim 2, wherein the first seat opening and the second seat opening are mutually symmetrical about a primary axis crossing through the seat.

5. The device according to claim 4, wherein the breakaway part comprises a breakaway pin provided with an incipient breaking so as to be breakaway, the breakaway pin being arranged off-centered with respect to the primary axis.

6. The device according to according to claim 1, wherein:
   the device comprises a mixer, which is formed by the adjuster and/or by a compartment of the housing, the mixer being configured for forming an outgoing water stream when the housing is coupled to the base by mixing two incoming water streams, the incoming water streams and the outgoing water stream belonging to said water streams exchanged between the housing and the base;

the housing is configured for leading, via the seat:
the incoming water streams from the base to the adjuster, and
the outgoing water stream from the adjuster to the base; and upon control from the controller, the adjuster adjusts the flow-rate of the incoming water streams so as to determine the proportion of the incoming water streams forming the outgoing water stream.

7. A valve system, comprising:
the device according to claim 1, and
the base which comprises the first base opening and the second base opening, the second coupling position being a position wherein the housing is pivoted about a main axis of the valve system with respect to the first coupling position.

8. The valve system according to claim 7, wherein:
the base comprises a fool proof guide and an obstructing surface; and
the breakaway part, when not broken, is arranged for being received in the fool proof guide, when the housing is coupled in the first coupling position and to prevent a coupling of the housing when the housing is in the second coupling position, by abutting the breakaway part against the obstructing surface.

9. The valve system according to claim 7, wherein:
the seat comprises a permanent pin, which is off-centered with respect to the main axis; and
the base comprises a first positioning guide and a second positioning guide, which are off-center with respect to the main axis, and which are arranged such that:
when the housing is in the first coupling position, the permanent pin is received sliding in, in the first positioning guide, parallel to the main axis, so as to set the housing in rotation with respect to the base about the main axis in the first coupling position, and
when the housing is in the second coupling position, the permanent pin is received sliding in, in the second positioning guide, parallel to the main axis, so as to set the housing in rotation with respect to the base about the main axis in the second coupling position.

10. The valve system according to claim 7, wherein:
the base comprises a recess which houses the seat when the housing is coupled to the base, the recess and the seat then delimiting therebetween an interstitial chamber;
the seat comprises a third seat opening, which is configured for leading a third water stream, among the water streams exchanged between the housing and the base, the third seat opening, opening into the interstitial chamber when the housing is coupled to the base in the first coupling position and when the housing is coupled to the base in the second coupling position.

11. A use of the device according to claim 1, the use comprising:
determining whether the first seat opening is to be fluidically connected to the first seat opening or the second seat opening;
coupling the housing with the base:
in the first coupling position, if it has been determined that the first seat opening is to be fluidically connected to the first base opening; or
after breaking the breakaway part, in the second coupling position, if it was determined that the first seat opening is to be fluidically connected to the second base opening.

\* \* \* \* \*